United States Patent [19]

Shevchenko

[11] 4,027,077
[45] May 31, 1977

[54] METHOD OF MAKING THERMAL BATTERIES AND BATTERIES, HAVING $V_2O_5$ ELECTRODE

[75] Inventor: Dmytro Shevchenko, Westminster, Md.

[73] Assignee: Catalyst Research Corporation, Baltimore, Md.

[22] Filed: Sept. 4, 1963

[21] Appl. No.: 307,765

[52] U.S. Cl. .............................. 429/112; 429/210; 429/218; 29/623.5
[51] Int. Cl.² ....................................... H01M 6/36
[58] Field of Search ............ 136/153, 90, 120, 175; 429/112, 210, 218; 29/623.5

[56] References Cited

UNITED STATES PATENTS

| | | | |
|---|---|---|---|
| 2,999,122 | 9/1961 | Zauner | 136/153 |
| 3,160,531 | 12/1964 | Spindler | 136/153 |
| 3,258,365 | 6/1966 | Klopp et al. | 429/112 |
| 3,345,214 | 10/1967 | Zauner et al. | 429/112 |
| 3,575,714 | 4/1971 | Bennett et al. | 429/112 |
| 3,884,719 | 5/1975 | Evans et al. | 429/112 |

Primary Examiner—Edward A. Miller
Attorney, Agent, or Firm—Brown, Murray, Flick & Peckham

EXEMPLARY CLAIM

1. The method of making a thermal battery, comprising continuously moving a nickel strip lengthwise, coating substantially half of one surface of the travelling strip with a mixture of $V_2O_5$ and glaze-forming material and a liquid carrier to form a band along the strip, heating said band to melt it to form a glaze, cooling the glazed strip, coating the remainder of said surface of the nickel strip with a metal from the group consisting of Mg and Ca to form a band thereof along the strip beside the glaze, cutting battery plates from the glazed half of the strip and from the bimetal half of the strip, and placing between a glazed plate and a bimetal plate a wafer having a $V_2O_5$ layer and an electrolyte layer, with the $V_2O_5$ layer engaging said glaze and with the coated side of the bimetal plate engaging the electrolyte layer.

4. A thermal battery comprising a wafer having a $V_2O_5$ layer and an electrolyte layer, a nickel cathode terminal plate, a glaze containing $V_2O_5$ on said plate engaging said $V_2O_5$ layer of the wafer, and a bimetal member consisting of a nickel anode terminal plate coated on one side with a metal from the group consisting of Mg and Ca, said coating metal engaging said electrolyte layer of the wafer.

5 Claims, 9 Drawing Figures

U.S. Patent  May 31, 1977  4,027,077
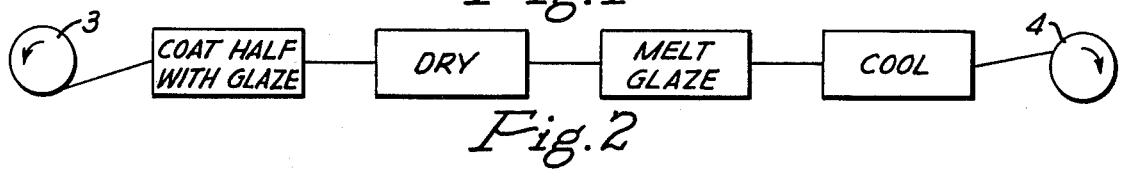
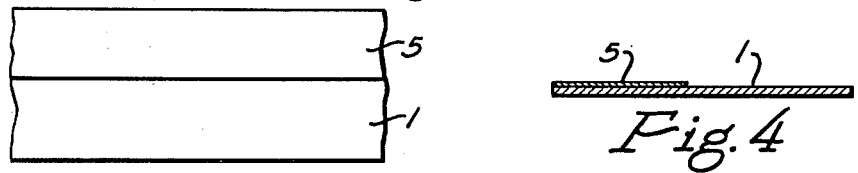
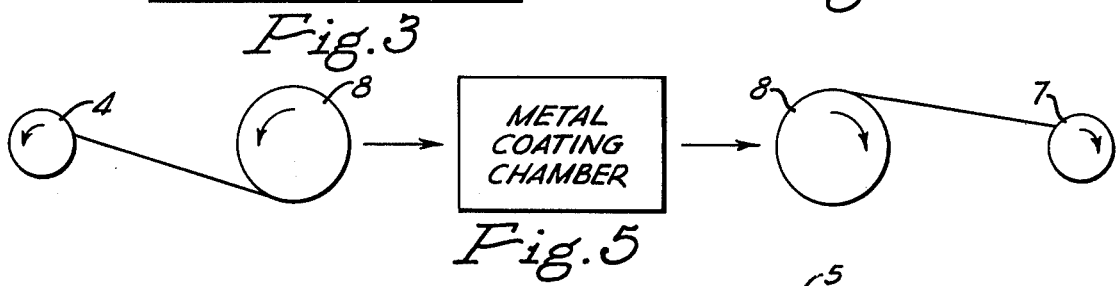
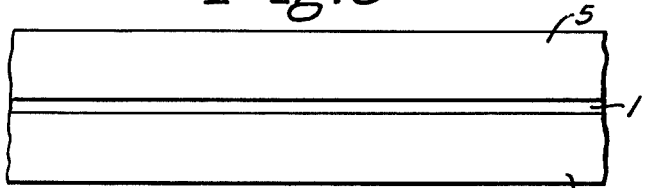
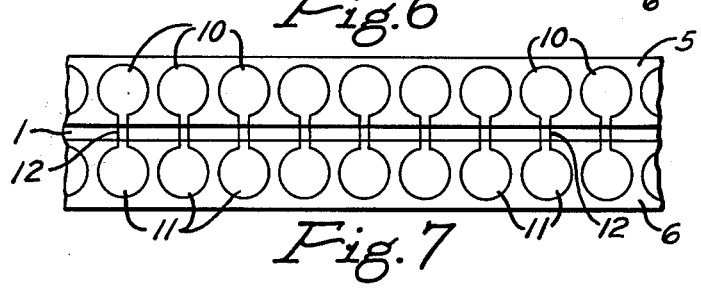
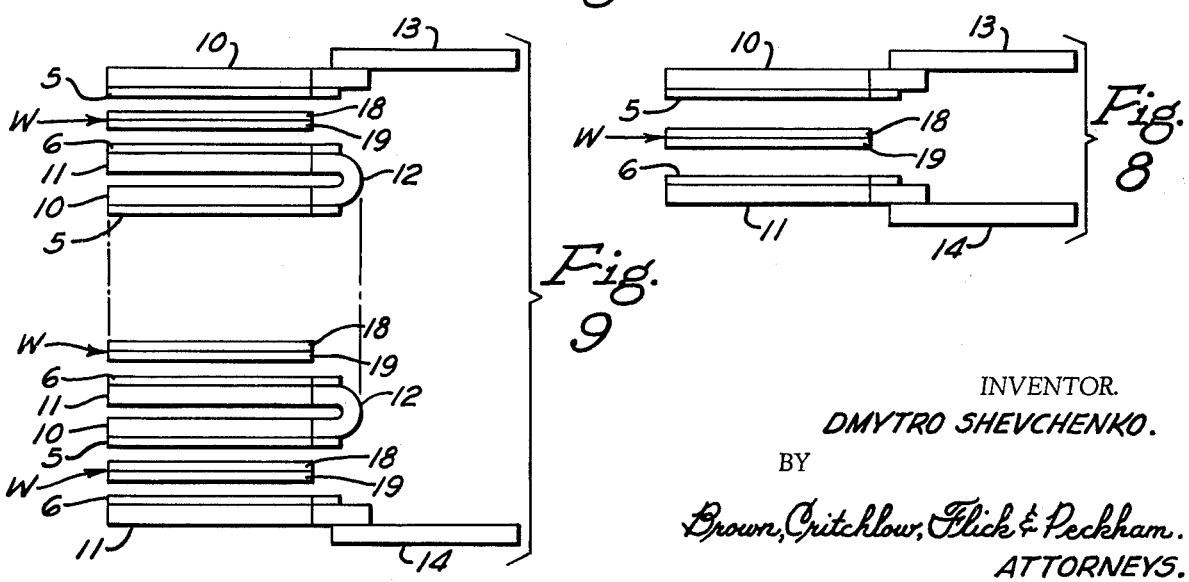
INVENTOR.
DMYTRO SHEVCHENKO.
BY
Brown, Critchlow, Flick & Peckham.
ATTORNEYS.

METHOD OF MAKING THERMAL BATTERIES AND BATTERIES, HAVING V$_2$O$_5$ ELECTRODE

This invention relates to thermal type deferred action batteries.

Batteries of this type are well known. They are inactive at normal atmospheric temperatures and become activated only when heat is supplied to them. They consist of one or more cells in which an electrolyte coacts with a pair of electrodes to produce electric current. The electrolyte is solid and inactive at ordinary temperatures, but becomes functionally active when heated to or above the temperature at which the conductive part of the electrolyte fuses or melts. Such batteries remain active only while the conductive part of the electrolyte is molten.

Heretofore, one type of thermal battery has had a magnesium electrode, a vanadium pentoxide electrode, a suitable solid electrolyte between them, and nickel terminal plates or discs. The electrodes and electrolyte were made up into a three-layer wafer inserted between the two nickel terminals. Since the V$_2$O$_5$ would have an unfavorable reaction with the adjacent nickel in the presence of the molten electrolyte, the face of the nickel next to the V$_2$O$_5$ was glazed with a mixture of V$_2$O$_5$ and boric acid. It required a great deal of time to make batteries in this manner, because each part was made and treated separately and the three-layer wafer tended to warp or curl. Around its edge the wafer had electrical bridges that resulted in voltage fluctuations at the beginning of battery performance. The nickel terminal plates were cut out of pieces of stock, degreased, acid etched singly or a few at a time in a tray, and then washed and dried. Some of the plates then were hand-painted with the glazing mixture, dried and then glazed in an oven a few at a time. The painting and glazing usually had to be repeated to eliminate bare nickel spots, and the thickness of the glaze was uneven throughout its area. It was a slow and expensive hand operation throughout.

It is among the objects of this invention to provide a method of making thermal batteries, which is very much simpler, less expensive, much more rapid and more satisfactory than the way in which such batteries have been made heretofore. Another object is to make an improved thermal battery.

In accordance with this invention, a properly prepared nickel strip is moved continuously lengthwise from one spool to another and, while it is travelling, one of its surfaces is coated across substantially half of its width with a mixture of V$_2$O$_5$ and H$_3$BO$_3$, or V$_2$O$_5$ and (NaPO$_3$)$_6$, and a liquid carrier to form a band along the strip. This band then is heated to melt it to form a glaze, and then the strip is cooled. The remainder of the same surface of the nickel strip then is coated with magnesium or calcium to form a band of that metal beside the glazing. The two bands are then cut up into battery plates of the desired size and shape. One of the glazed plates and one of the bimetal plates then are placed against the opposite sides of a wafer having a V$_2$O$_5$ layer and an electrolyte layer. The V$_2$O$_5$ layer engages the glazed side of the glazed plate, and the coated side of the bimetal plate engages the electrolyte layer. This method of making a battery is very fast compared with the way they have been made before, and the two-layer wafer remains flat.

The invention is illustrated in the accompanying drawings, in which

FIG. 1 is a flow diagram of the etching part of the method;

FIG. 2 is a flow diagram of the glazing part of the method;

FIG. 3 is a fragmentary plan view of the glazed nickel strip;

FIG. 4 is a cross section of the glazed strip;

FIG. 5 is a flow diagram of the metal-coating step of the method;

FIG. 6 is a fragmentary plan view of the completely coated strip;

FIG. 7 is an enlarged fragmentary plan view of the coated strip showing how plates may be cut from it;

FIG. 8 is an exploded view of a single cell battery, in which the thickness of the parts is greatly exaggerated; and FIG. 9 is a similar exploded view of a series type battery.

Referring to the drawings, a strip 1 of nickel that is a little wider than twice the width of the battery plates that are to be formed and that has been thoroughly degreased is etched with acid and then washed and dried. These steps can be performed best by performing them on the degreased strip as it is wound from one spool 2 to another spool 3 as shown in FIG. 1. The spool 3 of treated nickel strip then is mounted in the apparatus that will perform the next set of operations on it. In this apparatus the strip is again unwound from the supply spool and rewound on a take-up spool 4 as shown in FIG. 2. As the strip travels between the two spools, about half the width of its upper surface is coated with a glazing mixture formed from V$_2$O$_5$ and a glaze-forming material, such as H$_3$BO$_3$ and a liquid carrier, such as an acetone, a mixture of acetone and alcohol, a mixture of toluene and alcohol, or some other liquid carrier which can be evaporated easily. A band of this slurry therefore is coated or painted along one side of the strip. The band is dried and the strip then passes through an oven where it is heated to about 750° C to melt the V$_2$O$_5$ - H$_3$BO$_3$ band and form a glaze 5 of V$_2$O$_5$ - B$_2$O$_3$, after which the strip is cooled. During cooling the molten V$_2$O$_5$ - B$_2$O$_3$ solidifies. Then the strip is wound on the take-up spool. If desired, the glaze could be made from V$_2$O$_5$ - (NaPO$_3$)$_6$.

The general appearance of the glazed strip is shown in FIGS. 3 and 4 in plan and section. The glazing mixture fuses well to the etched nickel surface, thereby creating a strong mechanical bond. Then, in the next operation, the glazed strip is unwound from spool 4 and is wound spirally around a drum 8 in a well-known manner to cause each successive convolution to cover the glaze on the preceding convolution and also lap over the unglazed half of the strip for about one-eighth inch. The drum then is placed in a vacuum chamber where magnesium or calcium is evaporated onto the exposed nickel to form a band 6 of the coating metal along the strip beside the band of glaze. After cooling, followed by removal from the chamber, the strip is wound from the drum onto a spool 7. This completes the preparation of the nickel strip and it is now ready to be cut up into battery plates. A length of the coated strip is shown in FIG. 6, where it will be observed that a narrow band of the nickel strip between bands 5 and 6 remains uncoated.

As shown in FIG. 7, a series of separate battery plates 10 or 11 now is cut or stamped out of each half of the nickel strip so that half of the plates will be glazed on one side and the other half will be bimetallic. However, it is preferred to form the plates, in pairs, by which is meant that a glazed plate 10 will be integrally connected by a tendon 12 to the adjacent bimetal plate 11. Thereafter, except for plates that are to be used in batteries where the cells are assembled in series, the plates in each pair are separated by cutting the connecting tendon half way between them. Nickel leads 13 and 14 then may be spot welded to the tendon stubs.

After the plates have been cut out of the strip they are degreased and dried, ready for assembly with other members to make a battery. These other members are the wafers W that are placed between the plates and provide one electrode and the electrolyte, the other electrode being the coating of Mg or Ca carried by a nickel plate. Each wafer has two layers, one of vanadium pentoxide 18 and the other of a suitable electrolyte 19. As is known by those familiar with this art, the electrolyte will be an inorganic salt that is solid and electrically non-conducting at normal temperatures, for example potassium chloride, lithium chloride and kaolin, but which becomes an active electrolyte when heated to or above the melting point of the KCl - LiCl. The specific composition of the electrolyte forms no part of this invention because such electrolytes are well known. See, for example, copending patent application, Ser. No. 372,872, filed Aug. 7, 1953, now U.S. Pat. No. 3,575,714. However, it should be noted that contrary to earlier practice, the wafer has only two layers. It does not have the troublesome magnesium third layer that formed electrical bridges with the $V_2O_5$ layer, caused the earlier wafers to warp and increased the time and cost of making thermal batteries.

To assemble the parts, the glazed side 5 of a glazed nickel plate 10 is placed against the $V_2O_5$ side 18 of the wafer, and the metal-coated side 6 of a bimetal plate 11 is placed against the electrolyte side 19 of the wafer, as shown in FIG. 8. Plate 10 forms the cathode terminal, and the nickel part of bimetal plate 11 forms the anode terminal. When the resulting battery is heated to a high enough temperature, it will produce electricity that can be led off through the leads 13 and 14.

If the battery is to have two or more cells in series, a number of wafers W are alternated with pairs of the integrally connected plates 10 and 11 cut from the strip, with the tendon 12 that connects each plate 10 with a plate 11 bent double in the direction to cause the bare nickel sides of the two plates to be disposed face to face, as shown in FIG. 9. The metal-coated side 6 of one of these plates is placed against the electrolyte layer 19 of one adjoining wafer, and the glazed side 5 of the other plate is placed against the $V_2O_5$ layer 18 of the other adjoining wafer. The relation of the two end plates 10 and 11 to the wafers is the same as before. That is, the glazed side 5 of one plate 10 is placed against the exposed $V_2O_5$ layer of an adjoining wafer, while the metal-coated side 6 of the bimetal plate 11 is placed against the electrolyte layer of the wafer at the other end of the stock. The tendons 12 form low electrical resistance paths between the plates that they connect, whereby to increase the efficiency of the battery.

With the method disclosed herein a 500 foot strip of nickel can be provided with the glaze and metal coatings in a day and a half or two days, whereas under the old hand operation system it would have required a month. There likewise is a great saving in the etching time. The glaze is smooth and the same thickness throughout its area, which makes battery performance more consistent and reproducible. The time required to make a wafer W is reduced at least a third and a much better bond is provided between the magnesium or calcium and the nickel than when the nickel plate was merely pressed against the magnesium or calcium layer of a wafer. Also a considerable amount of room is saved in a battery case by using double instead of triple layer wafers since Mg, or Ca bimetal is about 0.005 inch thick whereas Mg layer is about 0.015inch thick. This saved battery room is used for additional cells or for the extra insulation which preserves the heat, thus prolonging the battery life.

I claim:

1. The method of making a thermal battery, comprising continuously moving a nickel strip lengthwise, coating substantially half of one surface of the travelling strip with a mixture of $V_2O_5$ and glaze-forming material and a liquid carrier to form a band along the strip, heating said band to melt it to form a glaze, cooling the glazed strip, coating the remainder of said surface of the nickel strip with a metal from the group consisting of Mg and Ca to form a band thereof along the strip beside the glaze, cutting battery plates from the glazed half of the strip and from the bimetal half of the strip, and placing between a glazed plate and a bimetal plate a wafer having a $V_2O_5$ layer and an electrolyte layer, with the $V_2O_5$ layer engaging said glaze and with the coated side of the bimetal plate engaging the electrolyte layer.

2. The method of making a thermal battery according to claim 1, in which said travelling nickel strip is acid etched, washed and dried before said coatings are applied.

3. The method of making a thermal battery, comprising continuously moving a nickel strip lengthwise, coating substantially half of one surface of the travelling strip with a mixture of $V_2O_5$ and glaze-forming material and a liquid carrier to form a band along the strip, heating said band to melt it to form a glaze, cooling the glazed strip, coating the remainder of said surface of the nickel strip with a metal from the group consisting of Mg and Ca to form a band thereof along the strip beside the glaze, cutting from the glazed side of the strip a first battery plate and from the bimetal side of the strip another battery plate spaced from said first battery plate but integrally connected thereto by a tendon cut from said strip, cutting separate independent battery plates from the glazed side of the strip and from the bimetal side of the strip, folding said tendon transversely to place the bare nickel sides of the connected plates against each other, placing between a glazed separate plate and said connected plates one wafer having a $V_2O_5$ layer and an electrolyte layer, and placing between a bimetal separate plate and said connected plates another wafer having a $V_2O_5$ layer and an electrolyte layer, with the $V_2O_5$ layer of each wafer engaging the glaze on a plate and with the electrolyte layer of each wafer engaging the coated side of a bimetal plate.

4. A thermal battery comprising a wafer having a $V_2O_5$ layer and an electrolyte layer, a nickel cathode terminal plate, a glaze containing $V_2O_5$ on said plate engaging said $V_2O_5$ layer of the wafer, and a bimetal member consisting of a nickel anode terminal plate coated on one side with a metal from the group consisting of Mg and Ca, said coating metal engaging said electrolyte layer of the wafer.

5. A thermal battery comprising at least two wafers each having a $V_2O_5$ layer and an electrolyte layer, at least one pair of superposed nickel plates, means at the edges of each pair of said plates integrally connecting them together, a coating of a metal from the group consisting of Mg and Ca on one side of one plate in each pair engaging the electrolyte layer of an adjoining one of said wafers, a glaze containing $V_2O_5$ on the other of said plates engaging the $V_2O_5$ layer of another of said wafers, said wafers and pairs of plates alternating with one another when more than one of said pairs is used, a nickel cathode terminal plate, a glaze containing $V_2O_5$ on said terminal plate engaging the $V_2O_5$ layer of an adjoining wafer, and a bimetal member consisting of a nickel anode terminal plate coated on one side with a metal from said group engaging the electrolyte layer of an adjoining wafer.

* * * * *